United States Patent Office 3,644,306
Patented Feb. 22, 1972

3,644,306
HIGH MOLECULAR WEIGHT, VULCANIZABLE TERPOLYMERS OF ETHYLENE, PROPYLENE AND ALKENYLSILANES AND PROCESSES FOR THE PREPARATION THEREOF
Paolo Longi and Francesco Greco, Milan, and Ermanno Bernasconi, Caronno Varesino, Varese, Italy, assignors to Montecatini Edison S.p.A., Milan, Italy
No Drawing. Continuation of abandoned application Ser. No. 686,688, Nov. 29, 1967. This application Aug. 18, 1969, Ser. No. 853,588
Claims priority, application Italy, Nov. 30, 1966, 30,561/66
Int. Cl. C08f *15/40*
U.S. Cl. 260—80.71
5 Claims

ABSTRACT OF THE DISCLOSURE

There are disclosed crosslinked terpolymers obtained from high molecular weight, normally solid, essentially linear, addition terpolymers of ethylene, propylene and alkenylsilanes selected from the group consisting of vinylsilane, allylsilane, propenylsilane, butenylsilane, dimethylallylsilane, butenylallyl silane, cyclohexylallylsilane, and cyclohexylbutenylsilane, which terpolymers contain, by mols, from 65% to 80% of ethylene, from 20% to 35% of propylene, and from 0.02% to 5.0% of alkenylsilane. The crosslinked terpolymers are characterized in having Si—O—Si crosslinks between silicon atoms of the polymerized alkenylsilane units in different macromolecular chains of the terpolymers, as evidenced by examination of the infra-red spectra thereof. A process for obtaining the terpolymers with the aid of catalysts prepared from transition metal compounds and organometallic compounds of aluminum, and a process for crosslinking the terpolymers in a liquid non-solvent swelling agent for the terpolymers are also disclosed.

---

This application is a continuation of Ser. No. 686,688, filed Nov. 29, 1967 now abandoned.

PRIOR ART

U.S. Pat. 3,223,686, issued on Dec. 14, 1965 to Giulio Natta et al., discloses the homopolymerization of vinyl monomers containing silicon atoms and having the general formula $$R_3\text{—Si—}(CH_2)_n\text{—}CH=CH_2$$

wherein R is hydrogen or an alkyl, cycloalkyl or aryl group and $n$ is an integer from 1 to 4; as well as the copolymerization of such vinyl monomers with ethylene and/or higher alpha-olefins. The copolymers described in said patent are either substantially crystalline or completely amorphous. Copolymers of the same type are also described in U.S. Pat. 3,240,768 issued on Mar. 15, 1966 to Karl R. Guenther. Those copolymers which, depending on the specific alkenylsilane used as one starting monomer, may also be unsaturated, contain from 0.01 to 20% by weight of an omega-alkenylsilane which may be halogen-substituted, and are generally substantially crystalline.

THE PRESENT INVENTION

An object of the present invention was to provide new crosslinked terpolymerizates of ethylene, propylene and certain alkenylsilanes containing Si—H bonds which, in the crosslinked state, have physical and mechanical characteristics resembling or comparable to those of vulcanized rubbers and of fibers.

Such products are not disclosed or suggested in the aforementioned patents and are new in the art.

The alkenylsilanes used as comonomers for the production of our new terpolymers correspond to the general formula $$R_nH_m\text{—}Si(CH_2)_p\text{—}CH=CH_2$$

in which R is a lower alkyl, cycloalkyl or aryl group; $m$ is an integer from 1 to 3; $n$ has a value of 0, 1 or 2; $m+n$ equal 3; and $p$ has a value of 0, 1, 2, 3 or 4.

Examples of alkenylsilanes which may be used in the preparation of the terpolymerizates of the present invention are: vinylsilane, allylsilane, propenylsilane, butenylsilane, dimethylallylsilane, cyclohexylallysilane, cyclohexylbutenylsilane.

Both before and after the crosslinking the amorphous terpolymers crosslinked according to the invention remain in the amorphous condition when in the relaxed state or when articles comprising the terpolymers are stretched only to a limited extent such that the elongation thereof as a result of the stretching is relatively low and not greater than 100% of the initial length. However, both before and after the crosslinking, and especially after the crosslinking, these initially amorphous terpolymers are capable of crystallizing under strong stretching, such as when articles comprising the amorphous terpolymers are elongated to 100% or more of the initial length thereof as a result of the stretching. In the stretched, crystallized condition, the initially amorphous terpolymer have very high tensile strengths.

The initially amorphous terpolymers capable of crystallizing under strong stretching contain 65 to 80% by mols of ethylene; 20 to 35% by mols of propylene; and 0.02 to 5% by mols of the alkenyl silane. Those terpolymers show, particularly after crosslinking, elongations at break of from 50% to 2000%; tensile strengths of from 5 kg./cm.$^2$ to 300 kg./cm.$^2$, particularly when vulcanized with the aid of mixes containing fillers; and elastic yields of from 80% to 100%.

Those terpolymers of the present invention which are initially partially crystalline (that is, as obtained and without being subjected to strong stretching) contain 2% to 70% by mols of ethylene; 30% to 98% by mols of propylene; and 0.02 to 5.0% by mols of the alkenylsilane, and exhibit a total crystallinity of 2% to 50% on the total polymer, which crystallinity is of both polyethylene type and (isotactic) polypropylene type. These initially partially crystalline terpolymers have elongations at break of 20% to 1000%; tensile strengths of 20 kg./cm.$^2$ to 400 kg./cm.$^2$; and elastic yields of 50% to 99%, which characteristics render said terpolymers particularly useful for the production of elastic fibers. The terpolymers containing from 65 to 70% by mols of ethylene and from 30 to 35% by mols of propylene may be partially crystalline (polyethylene and/or polypropylene crystallinity) or amorphous depending on the catalyst used in their preparation.

As indicated, the terpolymers of the invention are obtained using particular coordination catalysts under particular conditions.

In general, the catalysts are prepared from (a) a vanadium or titanium compound, for instance titanium trichloride, titanium tetrachloride, titanium alkoxy chloride, vanadium oxychloride, vanadium trichloride, vanadium tetrachloride, vanadium triacetylacetonate, vanadium alkoxy chloride etc., and
(b) an organometallic aluminum compound, for instance aluminum triethyl, aluminum triisobutyl, aluminum trihexyl, diethyl aluminum chloride, diethyl aluminum bromide, ethyl aluminum sesquichloride, ethyl aluminum dichloride, diethyl aluminum monoalkoxide, alkoxyethyl aluminum chloride, etc.

In practice, the catalyst used is one containing halogen, which may be contained in at least one of the catalyst-forming components (a) and (b).

The catalyst system may be selected in dependence on the kind of terpolymers to be produced, whether those which are partially crystalline as obtained, or those which are amorphous but capable of crystallizing under strong stretching.

Catalyst systems prepared from titanium trichloride and an alkyl aluminum compound are particularly useful in the production of crude (total) terpolymerizates which are partially crystalline as produced.

On the other hand, the catalysts based on vanadium compounds, more particularly hydrocarbon-soluble vanadium compounds, favor the production of terpolymerizates which are amorphous as produced.

The terpolymerization reaction is carried out in the absence of air and humidity, so far as practicable, by employing, as the polymerization medium or diluent, hydrocarbon solvents such as n-heptane, cyclohexane, benzene, toluene, or liquid propylene, and by operating at temperatures in the range $-80°$ C. to $+150°$ C., preferably $-20°$ C. to $+70°$ C.

In preparing terpolymers having the compositions stated herein, a mixture of the gases, ethylene and propylene, in predetermined molar ratio may be introduced into the polymerization zone. The gases may also be introduced separately, at different flow rates selected to maintain the desired relative molar ratios of the two monomers in the polymerization zone. Also, those monomers may be used in different phases, ethylene being introduced in the gaseous and propylene being maintained in the liquid condition and serving as the polymerization medium in which the ethylene is dissolved. Most conveniently, the alkenylsilane is introduced into the polymerization zone in the form of a hydrocarbon solution thereof.

For example, using a catalyst system based on $TiCl_3$ and an alkyl aluminum compound such as $Al(C_2H_5)_2Cl$ partially crystalline terpolymers having ethylene, propylene and alkenylsilane contents in the ranges stated above are obtained by using the three monomers in molar ratios such that the ratio of propylene to ethylene is from 1 to 15, and the ratio of propylene to alkenylsilane is from 50 to 1000.

The occurrence of the units deriving from the different monomers, in the macromolecular main chains of the terpolymers, can be controlled and predetermined by periodically varying the molar ratio between the monomers during the polymerization reaction, or by discontinuing feeding of one or two of the monomers to the polymerization zone at one or more stages of the polymerization reaction. Thus, using the mentioned modalities and suitable catalyst systems, such as those based on titanium trichloride, it is possible to favor the production of a partially crystalline terpolymer consisting of macromolecules comprising sequences formed of polymerized units of a single one of the monomers, or macromolecules in which polymerized units of a given one of the monomers are non-statistically (i.e., "non-randomly") distributed along the macromolecular main chain.

For instance, terpolymers the macromolecules of which show sequences of polymerized propylene units in isotactic arrangement can be obtained by suspending the introduction of ethylene into the polymerization zone during periods of the polymerization reaction in which propylene only is intoduced.

For the production of the amorphous terpolymers crystallizable under strong stretching and having ethylene, propylene and alkenylsilane contents in the ranges given, there may be used, for instance, a catalyst system based on vanadium triacetylacetonate and diethyl aluminum chloride, and the molar ratio of the monomers may be such that the ratio of propylene to ethylene is from 1 to 3, and the ratio of propylene to alkenylsilane is from 50 to 1000. Even amorphous terpolymers crystallizable under stretching consist of macromolecules in which the ethylene units are non-statistically (i.e. non-randomly) distributed along the macromolecular main chain.

If desired, the average molecular weight (average D.P.) of the terpolymerizates may be controlled by effecting the polymerization of the monomers in presence of a suitable molecular weight regulator such as hydrogen an organometallic compound of zinc or cadmium diethyl, or a halogenated hydrocarbon.

At the end of the polymerization, the terpolymer can be isolated from the reaction mass and freed of catalyst residues by pouring the latter into a 1:1 volume acetone/methanol mixture containing 5% of concentrated hydrochloric acid. The terpolymer which separates is then broken up into small pieces and washed several times with methanol acidified with HCl, then with pure methanol, and eventually dried at 100° C. under reduced pressure.

Regardless of the molar ratio of ethylene and propylene therein, and of the percent crystallinity exhibited thereby, if any, all of the terpolymers of this invention are essentially linear, free of cross-links, and completely soluble in boiling xylene and tetralin.

However, these terpolymers can be readily cross-linked (vulcanized) by converting the Si—H bonds of the alkenylsilane units to Si—O—Si cross-linkings.

The cross-linking reaction can be effected at temperatures in the range 60° C. to 200° C., preferably 80° C. to 120° C., in a liquid medium which is a non-solvent swelling agent for the terpolymer, such as an alcohol, a ketone, an ether, or a mixture of water and surface-active agents.

We have found that when the liquid medium is an alcohol or water, and the temperature is higher than 100° C., the cross-linking is facilitated by adding to the liquid medium substances selected from the following groups:

(1) hydroxide, oxides and alkoxides of alkali or alkali earth metals, such as lithium, sodium and potassium hydroxides; sodium oxide, sodium and potassium ethylate, etc., (2) ammonia, alkylamines, arylamines, alkylarylamines, heterocyclic amines, such as, for example, ammonia, trimethylamine, tributylamine, tribenzylamine, methylaniline, aniline, pyridine, and the like;

(3) mono- and polybasic organic and inorganic acids, of which hydrochloric, nitric, sulphonic, oxalic, acetic and tartaric acids are exemplary; and (4) chlorides of silicon or tin, or of organic or inorganic acids, such as, for example, thionyl chloride silicon and tin tetrachloride, benzoyl chloride, acetyl chloride, etc.

The addition of a substance of the kind set forth in groups (1) to (4) is necessary when the cross-linking is carried out at a temperature below 100° C., and regardless of the temperature when the liquid medium is a ketone or ether.

The cross-linking generally renders the terpolymers insoluble in any solvent, even at the solvent boiling temperature. The existence of the Si—O—Si cross-links involving the silicon atoms of the alkylsilane units present in different macromolecular chains of the terpolymers is apparent from examination of the infrared spectra of the terpolymers after the cross-linking treatment.

Various physical and mechanical properties of the terpolymers are modified by the cross-linking treatment, including the melting point, percent crystallinity exhibited on X-ray examination, tensile strength, elongation at break, and elastic yield. In particular, the tensile strength and the elastic yield are improved.

The combination of properties which are unique for these terpolymers, and by virtue of which the terpolymers resemble both vulcanized rubbers and fibers, and the ease with which the terpolymers can be cross-linked effectively, render the terpolymers especially valuable for the production of elastic fibers, elastic films and, in general, for the production of shaped manufactured articles useful in commercial applications requiring both good elastic characteristics and mechanical resistance.

The following examples are given to illustrate the invention and are not limiting.

EXAMPLE 1

The apparatus employed consists of 6-necked flask having a capacity of 700 cc., provided with mechanical stirrer, reflux condenser kept at —20° C., thermometer, dropping funnel, a pipe for the introduction of the gases and an oil bath kept at 30° C.

0.8 g. of $TiCl_3$ (ARA Stauffer), 1.4 g. of $Al(C_2H_5)_2Cl$ and 500 cc. of anhydrous n-heptane are introduced, under nitrogen atmosphere, into this apparatus. A propylene stream is then introduced at a pressure 65 mm. Hg higher than atmospheric pressure (flowrate 10 liters/hour) while, by means of the dropping funnel, 4 cc. of a 33% by volume solution of allylsilane in n-heptane are added. After 10 minutes the introduction of propylene is stopped and, at the same pressure, a gaseous mixture of ethylene and propylene having flow rates of, respectively, 22.5 liters/hour and 90 liters/hours (ethylene/propylene molar ratio: 1/4) is introduced. After 30 minutes the mixture of the gases is again replaced by propylene and the addition of allylsilane is repeated with the above modalities. The two polymerization stages of propylene and, respectively of the mixture of ethylene and propylene, are then repeated 6 times over a period of 4 hours.

The polymer is isolated by pouring the polymerization product into about 2 liters of 1:1 acetone:methanol mixture containing 5% of concentrated hydrochloric acid. The terpolymer which separates is broken into small pieces, which are washed repeatedly with methanol acidified with HCl, and then with pure methanol. After being dried at 100° C. under reduced pressure, 52 g. of a solid, white product having a rubbery appearance are obtained. The allylsilane content, determined by gravimetric analysis, is 0.35% by weight, based on the total polymer. The intrinsic viscosity, determined in tetrahydronaphthalene at 135° C. is 3.8 100 cc./g.

Examination of the I. R. absorption spectrum shows an ethylene content of 24.8% by mols, and a propylene content of 75% by mols; it shows, moreover, the presence of 4% polyethylenic type crystallinity and of 18% polypropylenic type crystallinity, based on the total polymer. The ultimate melting point, determined with a polarized light microscope (heating velocity: 0.5° C./min.) is 147° C.

By successive extractions with boiling solvents, the following results have been obtained; 13% of diethyl ether extract consisting of completely amorphous polymer; 11.5% of n-heptane extract consisting of polymer having a weak crystallinity both of polyethylenic and polypropylenic type; 75.5% of n-heptane residue, consisting of polymer having both polyethylenic and polypropylenic crystallinity.

10 g. of the crude (unfractionated) polymer, after having been pressed into laminae at 180° C., are treated with 200 cc. of a mixture of butanol and aqueous ammonia in the ratio 4:1 at 100° C. for 10 hours. After this cross-linking treatment, the product is insoluble in any solvent, even boiling solvents; the examination of the I. R. spectrum shows the disappearance of the band at 4.63μ, which is characteristic of the Si—H bond.

Table 1 contains a comparison of some characteristics of the crude polymer, before and after the cross-linking.

EXAMPLE 2

The process described in Example 1 is repeated, but in this case, 48 cc. of the 33% by volume heptane solution of allylsilane are added in total, and this addition is carried out continuously, both during the propylene polymerization and during polymerization of the ethylene-propylene mixture.

The polymer, purified and isolated as described in Example 1, amounts to 50 g. has an allylsilane content of 0.53% by weight, an intrinsic viscosity of 4.2 100 cc./g., a content of ethylene and propylene respectively of 28 and 71.7% by mols, a polyethylenic crystallinity of 5% and a polypropylenic crystallinity of 15% based on the total polymer, and a melting point of 145° C. Extraction of the crude polymer with boiling diethyl ether and n-heptane results in fractions similar to those of the polymer described in Example 1. The polymer is cross-linked as in Example 1. Table 1 contains a comparison of some of the mechanical characteristics of a sample of this crude polymer, both prior to, and after, the cross-linking.

EXAMPLE 3

Example 1 is repeated except that two feeding stages of the monomers are alternated during the polymerization in each of which there are used ethylene/propylene mixtures (molar ratio 1:4) having the following flow-rates:

low flow-rate stage (feeding time: 5 minutes): ethylene=8.2 liters/hour, propylene=33 liters/hour;
high flow-rate stage (feeding time: 40 minutes): ethylene=22.5 liters/hour, propylene= 90 liters/hour.

The addition of the heptane solution of allylsilane is carried out only (2.5 cc. each time) when the ethylene-propylene mixture is fed at the lower rates. The total polymerization time is 4 hours and 30 minutes during which 6 feeding stages at the higher rates are carried out. The polymer, which is isolated and purified as described in Example 1, amounts to 52 g., has an allylsilane content of 0.16% by weight, an intrinsic viscosity of 4.9. 100 cc./g., a content of ethylene and propylene respectively of 38 and 61.9% by mols, a polyethylenic crystallinity of 5.7% and polypropylenic crystallinity of 6.3% based on the total polymer, and a melting point of 135° C.

By successive extractions with boiling solvents, the following results have been obtained:

20% of diethyl ether extract, consisting of completely amorphous polymer;
35.5% of n-heptane extract and 44.5% of n-heptane residue;
each of these fractions exhibit both polyethylenic and polypropylenic crystallinity.

Table 1 contains a comparison of some of the mechanical properties of the crude polymer, in the non-cross-linked condition and after crosslinking according to the process described in Example 1.

EXAMPLE 4

The polymerization process of Example 3 is repeated. However the duration of the two feeding stages is varied:

low flow-rate stage (ethylene: 8.2 liters/hour, propylene 33 liters/hour)=15 minutes;
high flow-rate stages (ethylene: 22.5 liters/hour, propylene: 90 liters/hour)=30 minutes.

Moreover, during all the polymerization time a hydrogen stream is introduced at a pressure of 65 mm. Hg higher than atmospheric pressure; this stream has a flow rate of 5.7 liters/hour during the low flow rate feeding stages and of 22.8 liters/hour during the high flow-rate feeding stages. The 33% by volume heptane solution of allylsilane is added during the low flow rate feeding stages (3 cc. during the entire run). The total polymerization time is 4 hours and 30 minutes, during which 6 low flow rate feeding stages and 6 high flow rate feeding stages have been carried out. The polymer, isolated as described in Example 1, amounts to 33 g. and has an allylsilane content of 0.2% by weight, an intrinsic viscosity of 2.5, 100 cc./g.; a molar content of ethylene and propylene, respectively, of 38.6 and 61.3%, a polyethylenic crystallinity of 6.5% and a polypropylenic crystallinity of 4.9% based on the total polymer, and a melting point of 135° C. The successive extractions have given the following results: 31.4% of diethyl ether extract which is completely amorphous; 45.2% of n-heptane extract and 23.4% of n-heptane residue; both of the last mentioned fractions show both polyethylenic and polypropylenic crystallinity.

Table 1 contains a comparison of some of the mechanical characteristics of a sample of the crude (total) polymer prior to cross-linking and after cross-linking under conditions as described in Example 1.

EXAMPLE 5

600 cc. of anhydrous n-heptane, through which a gaseous stream consisting of propylene (flow rate 67.5 liters/hour) and ethylene (15 liters/hour) is bubbled at atmospheric pressure, are introduced under nitrogen atmosphere into an apparatus similar to the one described in Example 1, but provided with two dropping funnels. After 10 minutes 1.2 g. of $TiCl_3$(ARA Stauffer), 2.2 g. of $Al(C_2H_5)_2Cl$, 0.5 g. of $Zn(C_2H_5)_2$ in 200 cc. of anhydrous n-heptane and 1.5 cc. of the 33% by volume heptane solution of allylsilane are introduced.

After 10 minutes of polymerization, 2 cc. of a 0.15 M heptane solution of $Zn(C_2H_5)_2$ and, after a further 10 minutes, 1.5 cc. of the heptane solution of allylsilane are added. The alternate addition of each of these solutions is repeated 6 times, while the flow rate of the gases is kept constant, at the stated values, throughout the polymerization.

After 2 hours, the polymerization is stopped and, by operating according to the modalities described in Example 1, 67 g. of polymer are obtained, having an intrinsic viscosity of 1.23 100 cc./g. The examination of the I.R. absorption spectrum shows a content of ethylene and propylene, respectively, of 22.2% and 77.5% by mols, a polyethylenic crystallinity of 1% and a polypropylenic crystallinity of 12% based on the total polymer, and an allylsilane content of 0.33% by weight. By successive extractions with boiling solvents, the following results have been obtained: 58.4% of diethyl ether extract, which is completely amorphous; 32.1% of n-heptane extract and 9.5% of n-heptane residue; both of the latter fractions exhibit both polyethylenic and polypropylenic crystallinity. Table 1 contains some of the mechanical characteristics of a sample of the crude polymer both before and after cross-linking thereof. Fibers can be obtained easily from the crude or total polymer in the molten state, which fibers after cross-linking by treatment with alkaline alcoholic solutions, show mechanical characteristics similar to those above mentioned and shown in Table 1.

TABLE 1

| Polymer of Example Number | 1 | 2 | 3 | 4 | 5 |
|---|---|---|---|---|---|
| Elongation at break (percent) | | | | | |
| Non-cross-linked | 570 | 640 | 780 | 800 | 800 |
| Cross-linked | 560 | 580 | 610 | 460 | 760 |
| Tensile strength, (kg./cm.²): | | | | | |
| Non-cross-linked | 128 | 87 | 138 | 64 | 31 |
| Cross-linked | 195 | 186 | 194 | 95 | 52 |
| Elongation (percent):* | | | | | |
| Non-cross-linked | 130 | 145 | 155 | 158 | 122 |
| Cross-linked | 155 | 187 | 194 | 182 | 154 |
| Tensile strength (kg./cm.²):* | | | | | |
| Non-cross-linked | 167 | 80 | 122 | 92 | 125 |
| Cross-linked | 189 | 183 | 175 | 167 | 160 |
| Recovery after elongation (percent):* | | | | | |
| Non-cross-linked | 66 | 72 | 91 | 93 | 91 |
| Cross-linked | 91 | 91 | 92 | 94 | 96 |

*Determined on a sample pre-stretched at 90% of the elongation at break.

EXAMPLE 6

An apparatus is employed which consists of a 4-neck cylinder, having a capacity of 3000 cc., provided with mechanical stirrer, thermometer and a tube for the gas inlet. 1500 cc. of anhydrous heptane, 1.5 g. (12.5 mols) of aluminum diethyl monochloride, 0.6 cc. of a heptane solution containing 0.1 mol of $Zn(C_2H_5)_2$ in 100 cc. and 10 cc. of a 33% by volume heptane solution of allylsilane are introduced under nitrogen atmosphere into this apparatus.

The whole is cooled to −20° C. by means of a bath of Dry Ice and acetone and a gaseous mixture of ethylene and propylene is introduced having flow-rates, respectively, of 265 liters/hour and 335 liters/hour. After 10 minutes 200 cc. of a toluene solution containing 0.18 g. (0.5 mmol) of vanadiumtriacetylacetonate are added. After 30 minutes the polymerization is stopped, the reaction product is treated, in a separatory funnel, with 1.0 liter of methanol containing about 2% of HCl and the heptane phase is separated from the methanolic phase. The heptane phase is repeatedly washed with pure methanol and eventually the polymer, which is dissolved, is precipitated by pouring the heptane phase into about 3 liters of acetone. After drying at 80° C. under reduced pressure, 30 g. of solid, white polymer having a rubbery appearance, are obtained. The allylsilane content, determined by gravimetric analysis is 0.1% by weight based on the total polymer. The intrinsic viscosity, determined in tetrahydronaphthalene at 135° C., is 0.70 dl./g. The examination of the I.R. spectrum of the product shows a content of ethylene and propylene, respectively, of 78.5 and 21.5% by mols. Under X-ray examination, the crude polymer is completely amorphous; it is completely soluble in boiling n-heptane. 10 g. of crude polymer, pressed into a lamina at 150° C. are treated with a solution of 20 g. of KOH in 200 cc. of n-butanol at 80° C. for 20 hours. After this treatment, the product is insoluble in any solvent, even at the boiling point. Examination of the I.R. absorption spectrum shows the disappearance of the band at 4.63 microns, which is characteristic of the Si—H bond. A sample of molded and cross-linked product, submitted to an elongation of 400% of the initial length and examined at the X-rays, shows the presence of polyethylenic type crystallinity bands. Table 2 shows some properties of the cross-linked crude (total) polymer.

EXAMPLE 7

1500 cc. of anhydrous n-heptane, 0.5 cc. of a heptane solution containing 0.1 mol of $Zn(C_2H_5)_2$ in 100 cc. of anhydrous n-heptane and 10 cc. of a 33% by volume heptane solution of allylsilane are introduced into the apparatus described in the preceding example.

The whole is cooled to −20° C. and a gaseous mixture of ethylene and propylene having flow rates, respectively, of 265 liters/hour and 335 liters/hour is introduced.

After 10 minutes, the catalyst, which is prepared immediately before its use, is introduced by adding 0.64 g. (5.0 mols) of diethyl aluminum chloride to a solution of 0.09 g. (0.5 mol) of $VOCl_3$ in 50 cc. of n-heptane cooled to −40° C.

After 30 minutes of polymerization at −20° C., the polymer is isolated as described in Example 6. It amounts to 47 g., has an allylsilane content of 0.12% by weight and a content of ethylene and propylene of, respectively, 76% and 24% by mols. The intrinsic viscosity is [η]=1.42 dl./g. This product is completely amorphous under X-ray examination and is soluble in boiling n-heptane. Also in this case, 10 g. of polymer are pressed into a lamina at 150° C. and cross-linked by the method described in the preceding example. The result of the mechanical tests carried out on the sample are shown in Table 2. A sample of crude polymer, molded and cross-linked, submitted to an elongation of 700% with respect to the initial length and examined under the X-rays, shows the appearance of polyethylenic type crystallinity bands.

TABLE 2.—MECHANICAL PROPERTIES OF AMORPHOUS ETHYLENE - PROPYLENE - ALLYLSILANE TERPOLYMERS WHICH ARE CRYSTALLIZABLE UNDER STRETCHING

| Example | Elongation at break (percent) | Tensile strength (kg./cm.²) | Elastic yield after 100% elongation |
|---|---|---|---|
| 6 | 500 | 60 | 94 |
| 7 | 850 | 190 | 96 |
| 8 | 250 | 40 | 98 |

EXAMPLE 8

1500 cc. of anhydrous n-heptane and 30 cc. of a 33% by volume heptane solution of allylsilane are introduced into the apparatus described in Example 6. The whole is cooled to —20° C. and a gaseous mixture of ethylene and propylene is fed having, respectively, flow rates of 80 liters/hour and 120 liters/hour. After 10 minutes the catalyst, which is prepared as described in the preceding example, is introduced. However, the catalyst is prepared from 0.09 g. (0.5 mol) of VOCl$_3$ and 0.31 g. (1.25 mols) of aluminium ethyl sesquichloride. After 20 minutes of polymerization at —20° C., 61 g. of polymer having an allylsilane content of 0.98% by weight, an ethylene and propylene content of, respectively, 68.0% and 31.0% by mols and an intrinsic viscosity [$\eta$] of 3.57 dl./g. are obtained. On X-ray examination, the polymer is found to be completely amorphous, it is soluble in boiling n-heptane.

Samples are prepared from a lamina obtained by molding the crude total product at 150° C. and are submitted to mechanical tests after cross-linking using the same procedure of Example 6. The results are shown in Table 2.

A sample of the cross-linked polymer submitted to a 200% elongation with respect to the initial length shows, on X-ray examination, the appearance of polyethylenic type crystallinity bands.

EXAMPLE 9

Example 1 is repeated using vinylsilane as alkenylsilane (1.5 g. introduced into the polymerization solvent already cooled to —20° C.).

7 g. of copolymer are obtained showing under the I.R. examination, an ethylene content of 30% by mols, a propylene content of 69.5% by mols and a silane content of 0.5% by mols.

The intrinsic viscosity is 3.1 dl./g.

The product, after cross-linking with the procedure of Example 1, shows mechanical characteristics similar to those of the product prepared according to said example.

As will be apparent, changes and modifications can be made in details in practicing the invention. Therefore, we intend to include in the scope of the appended claims all such variations as may be obvious to those skilled in the art from the description and working examples given herein.

We claim:
1. As a new composition of matter, a crosslinked, high molecular weight, normally solid addition terpolymer which, prior to crosslinking is essentially linear, and which contains, by mols, from 65% to 80% of polymerized ethylene units, from 20% to 35% of polymerized propylene units, and from 0.02% to 5.0% of polymerized units of an alkenylsilane selected from the group consisting of vinylsilane, allylsilane, propenylsilane, butenylsilane, dimethylallylsilane, cyclohexylallylsilane, and cyclohexylbutenylsilane, said crosslinked terpolymer being characterized in that the crosslinks consist of Si—O—Si crosslinks.

2. Crosslinked terpolymers according to claim 1, further characterized in exhibiting crystallinity of the polyethylenic type when subjected to X-ray examination after being stretched at least 100% of the initial length thereof.

3. Shaped, manufactured articles comprising crosslinked terpolymers according to claim 2.

4. Elastic fibers comprising crosslinked terpolymers according to claim 2.

5. Elastic films comprising crosslinked terpolymers according to claim 2.

References Cited

UNITED STATES PATENTS 3,223,686  12/1965  Natta et al.
3,240,768   3/1966  Guenther.

FOREIGN PATENTS 1,001,838  8/1965  England _____ 260—80.71

JOSEPH L. SCHOFER, Primary Examiner

S. M. LEVIN, Assistant Examiner

U.S. Cl. X.R.

260—80 P, 88.1 R